United States Patent [19]

Saito

[11] Patent Number: 4,644,426
[45] Date of Patent: Feb. 17, 1987

[54] FLOPPY DISK DRIVE APPARATUS

[75] Inventor: Shunji Saito, Numazu, Japan

[73] Assignee: Tokyo Electric Co., Ltd., Tokyo, Japan

[21] Appl. No.: 602,179

[22] Filed: Apr. 19, 1984

[30] Foreign Application Priority Data

Apr. 27, 1983 [JP] Japan .................................. 58-74780
Apr. 27, 1983 [JP] Japan .................................. 58-74781

[51] Int. Cl.$^4$ ............................................. G11B 19/10
[52] U.S. Cl. ...................................................... 360/71
[58] Field of Search ..................... 360/69, 71, 73, 75, 360/74.5, 74.6

[56] References Cited

U.S. PATENT DOCUMENTS

| | | | |
|---|---|---|---|
| 4,246,618 | 1/1981 | Bauer | 360/99 |
| 4,359,763 | 11/1982 | Hoffman | 360/99 |
| 4,376,293 | 3/1983 | Teramura et al. | 360/71 |
| 4,458,273 | 7/1984 | Johnson | 360/74.1 |

FOREIGN PATENT DOCUMENTS

| | | | |
|---|---|---|---|
| 57-30141 | 2/1982 | Japan | 360/69 |
| 57-212659 | 12/1982 | Japan | 360/69 |
| 58-1856 | 1/1983 | Japan | 360/99 |
| 58-29177 | 2/1983 | Japan | 360/137 |
| 59-116959 | 7/1984 | Japan | 360/137 |

Primary Examiner—George G. Stellar
Attorney, Agent, or Firm—Frishauf, Holtz, Goodman & Woodward

[57] ABSTRACT

A floppy disk drive apparatus includes a spindle for holding a floppy disk, a motor which is driven in response to a drive signal from a drive signal generator, thereby rotating the spindle, a head for writing data into this floppy disk and reading out data therefrom, and a control circuit which detects an index hole of the floppy disk and generates an index signal. This control circuit is provided with an inhibiting circuit for inhibiting the drive signal supplied to the motor when it has been detected that the floppy disk is not held on the spindle.

24 Claims, 14 Drawing Figures

F I G. 8
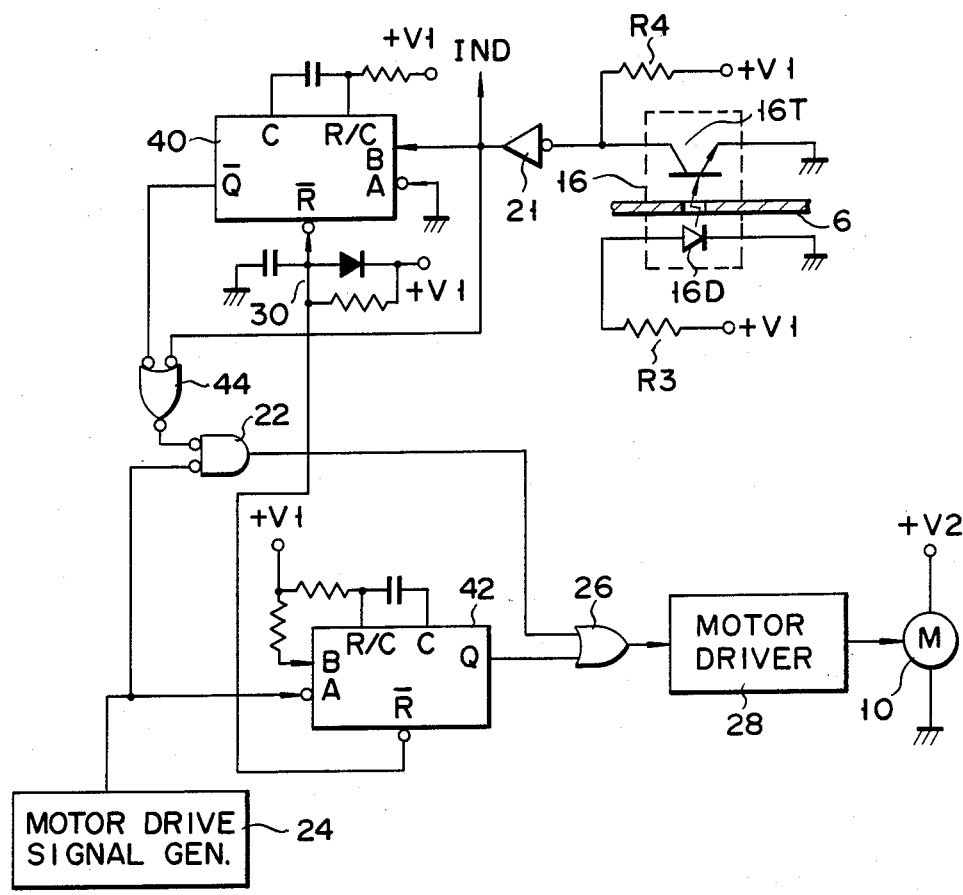

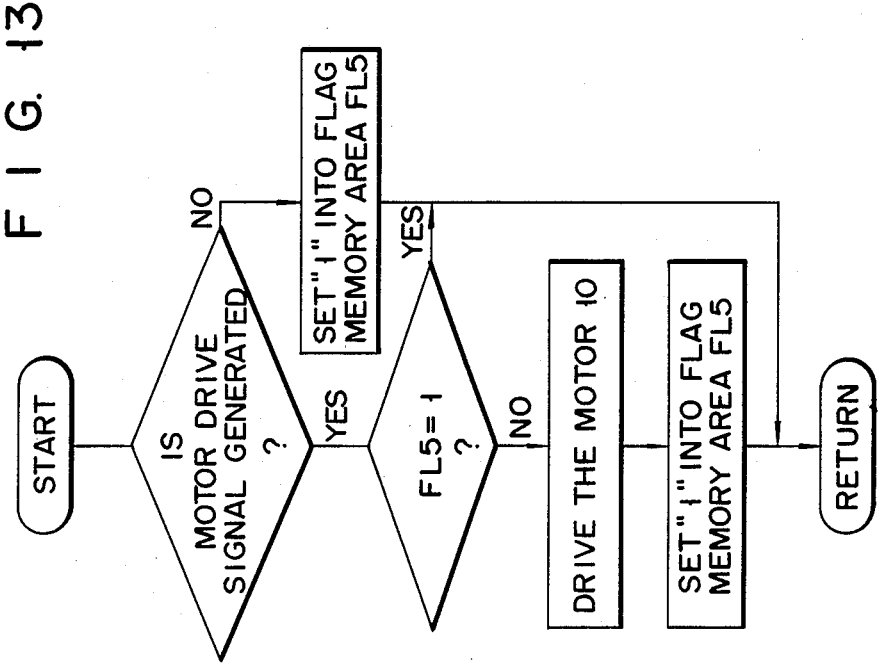
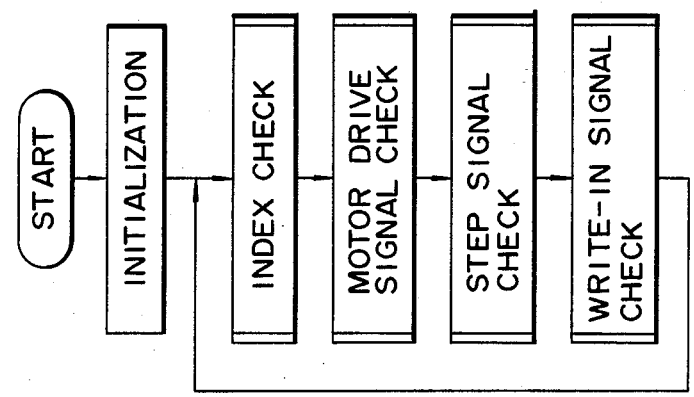

F I G. 12A
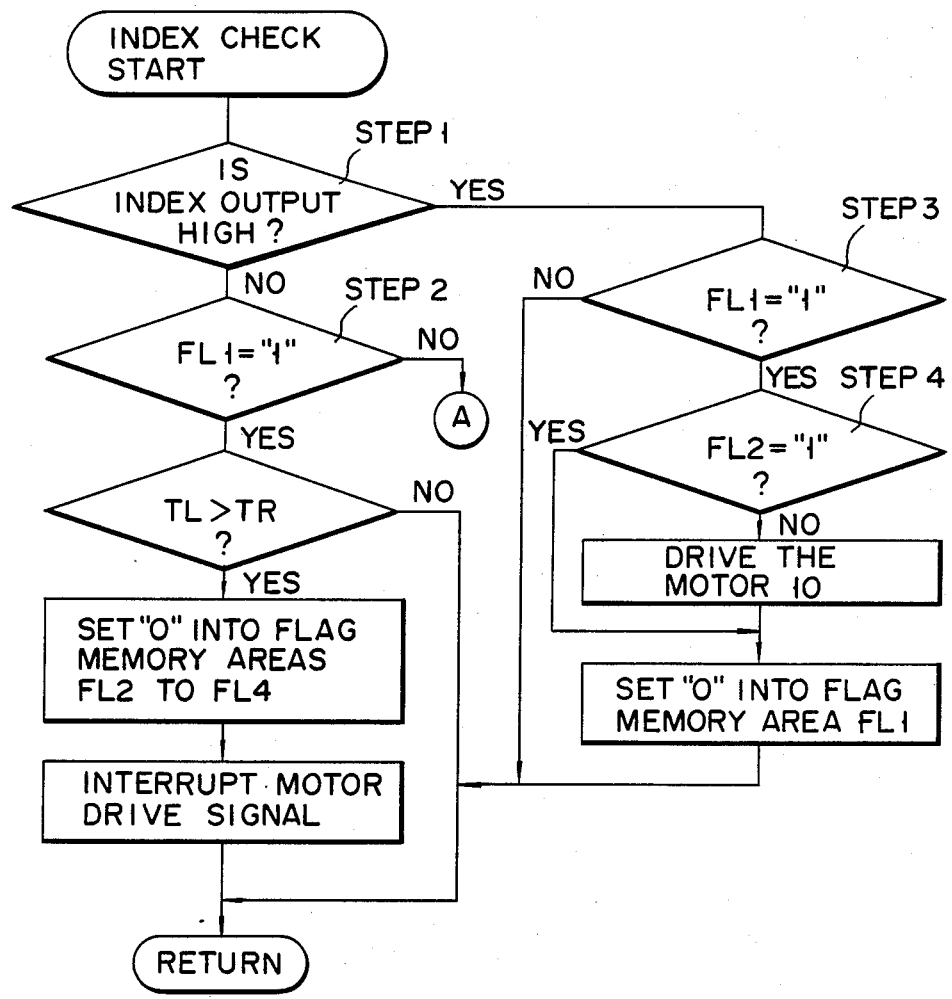

FLOPPY DISK DRIVE APPARATUS

BACKGROUND OF THE INVENTION

The present invention relates to a floppy disk drive apparatus.

Conventionally, as shown in FIG. 1, there is known a data processing system in which a plurality of floppy disk drive devices FDD-1 to FDD-N are coupled to a host computer HC. These floppy disk drive devices FDD-1 to FDD-N are selectively driven in response to drive select signals DSS-1 to DSS-N from the host computer HC. A disk drive motor of the floppy disk drive device thus selected is rotated in response to a motor drive signal MDS from the host computer HC, thereby enabling the data read out from the floppy disk to be transferred to the host computer HC and the data from the host computer HC to be written into the floppy disk. However, in this case, the motor drive signal MDS from the host computer HC is supplied not only to the floppy disk drive device selected but also to other nonselected floppy disk drive devices. Therefore, the disk drive motors of all the floppy disk drive devices can be driven in response to the motor drive signal MDS irrespective of whether the floppy disk is inserted or not, which causes the service lives of these disk drive motors to be shortened and the electric power consumption to be needlessly increased.

SUMMARY OF THE INVENTION

It is an object of the present invention to provide a floppy disk drive apparatus which can prevent the continuous driving of disk drive motors when no floppy disk is inserted.

This object is accomplished by a floppy disk drive apparatus comprising: a disk holding member for holding a floppy disk; a disk drive section which is driven in response to a drive signal, thereby rotating the disk holding member; a head section for writing data into this floppy disk and reading out the data therefrom; and a control section for inhibiting the supply of the drive signal to the disk drive section when it is detected that the floppy disk is not held on the disk holding member.

In the present invention, when it is detected that no floppy disk is held on the disk holding member, the supply of the drive signal for allowing the disk drive section to be driven is cut off; therefore, when no floppy disk is inserted, this disk drive section is not driven, thereby preventing the service life of this disk drive section from being needlessly shortened.

BRIEF DESCRIPTION OF THE DRAWINGS

FIG. 8 shows a modification of the control circuit shown in FIG. 7;

FIG. 11 is a flow chart showing a main routine which the floppy disk drive apparatus shown in FIG. 10 executes;

FIGS. 12A and 12B are flow charts showing an index check subroutines in FIG. 11; and FIG. 13 is a flow chart showing a motor drive signal check in FIG. 11.

DETAILED DESCRIPTION OF THE PREFERRED EMBODIMENTS

Figure 1:
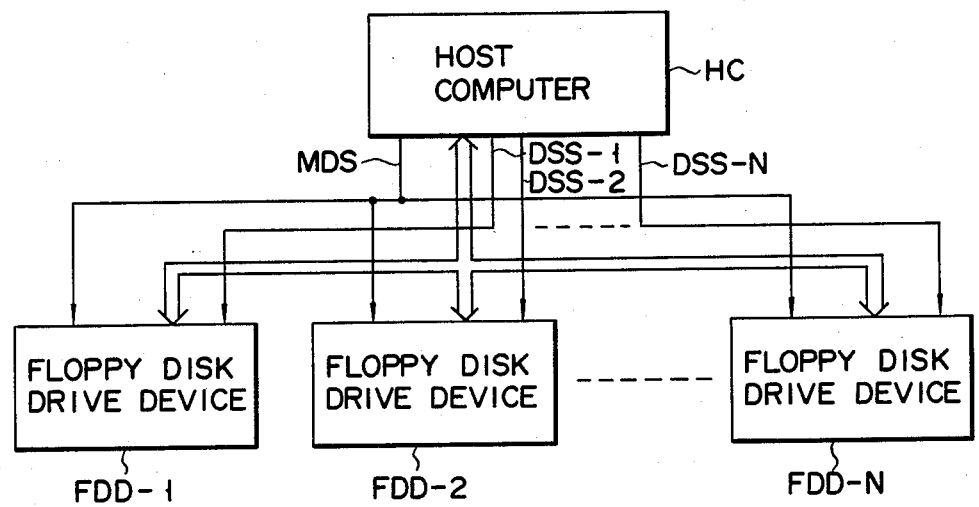
FIG. 1 shows a conventional data processing system incorporating a host computer to which a plurality of floppy disk drive apparatuses are coupled.
Figure 2:
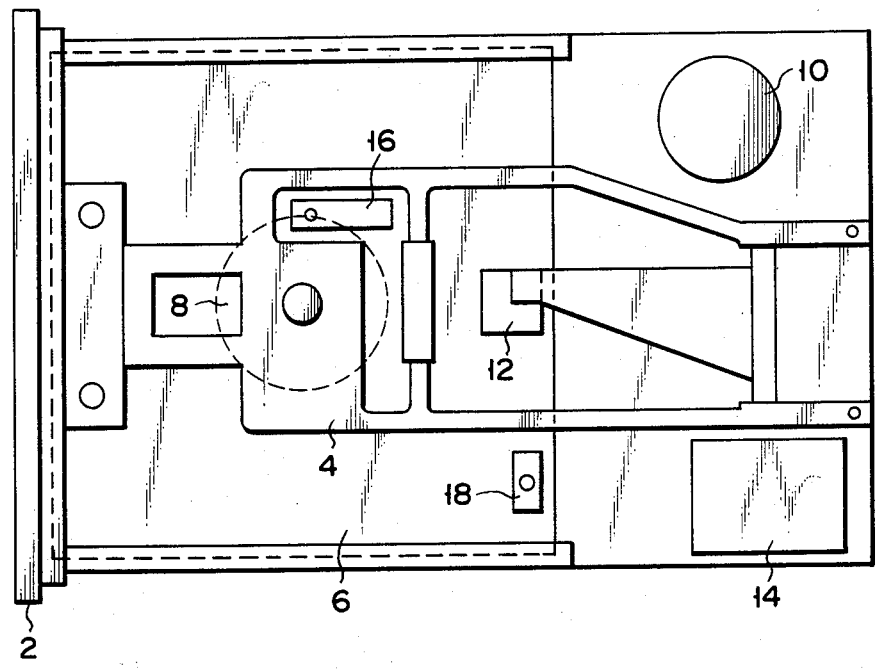
FIGS. 2 and 3 illustrate a schematic top plan view and a side elevational view of a floppy disk drive apparatus according to one embodiment of the present invention.
Figure 3:
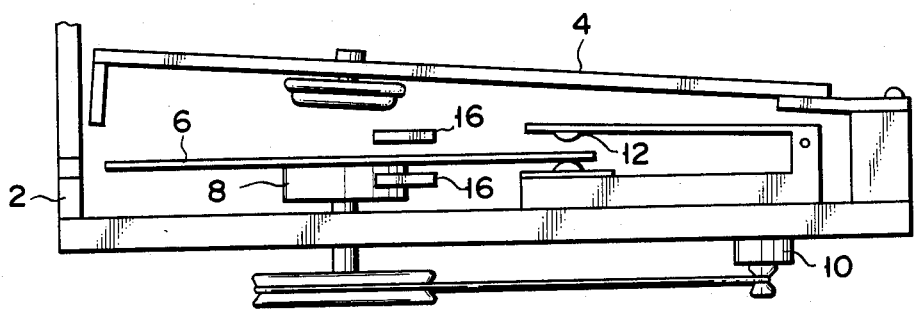

FIGS. 2 and 3 illustrate a schematic top plan view and a side elevational view of a floppy disk drive apparatus according to one embodiment of the present invention. This floppy disk drive apparatus includes: a front panel 2 having a disk receiving portion; a clamping arm 4 for fixing a floppy disk 6 inserted through this disk receiving portion on a spindle 8; a motor 10 for rotating this spindle 8; a recording/reproducing head 12; and a motor 14 for driving this recording/reproducing head 12 step by step in the radial direction of the floppy disk 6. This floppy disk drive apparatus further includes an index hole detector 16 for detecting an index hole of the floppy disk 6 and a disk detector 18 for detecting that the floppy disk 6 is inserted. Each of these detectors 16 and 18 has, for example, a light-emitting section and a photo-sensing section.

Figure 4:
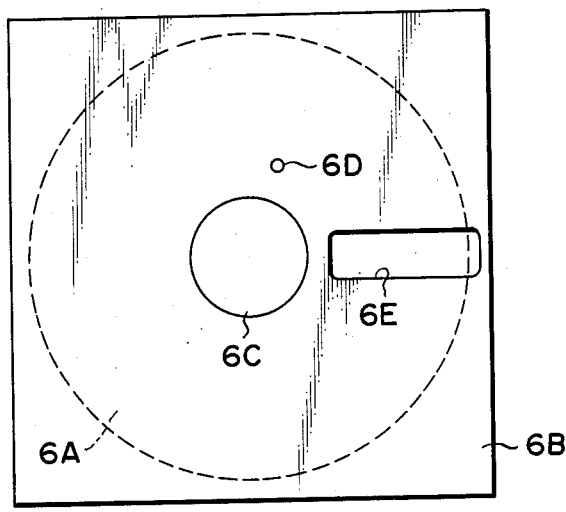
FIG. 4 shows a floppy disk which is used in the floppy disk drive apparatus shown in FIGS. 2 and 3.

As shown in FIG. 4, the floppy disk 6 has a recording medium 6A and a casing 6B for enclosing this recording medium 6A. The recording medium 6A and casing 6B are formed with holes 6C adapted to be engaged with the spindle 8 at their centers, and at the same time index holes 6D are also formed. Furthermore, this casing 6B is formed with an opening portion 6E for enabling the recording medium 6A to be brought into contact with the head 12.

Figure 5:
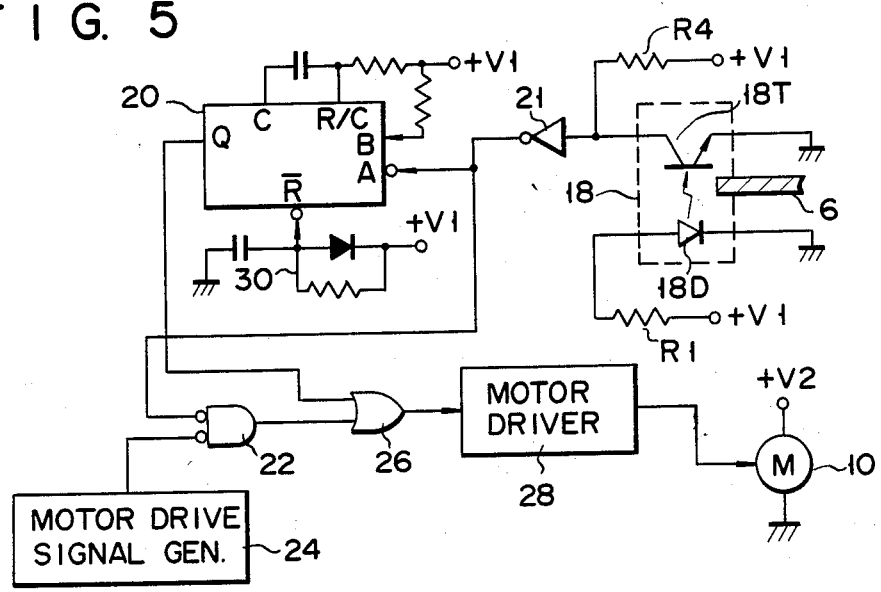
FIG. 5 shows a control circuit of the floppy disk drive apparatus shown in FIGS. 2 and 3.

FIG. 5 shows a control circuit to control the operation of the motor 10. In this control circuit, the disk detector 18 includes a light-emitting diode 18D and a phototransistor 18T. The light-emitting diode 18D and phototransistor 18T are coupled to a power source terminal +V1 through respective resistors R1 and R2. In addition, a collector of the phototransistor 18T is coupled to an A input terminal of a monostable multivibrator 20 through an inverter 21 and is also coupled to one input terminal of an input inverting type AND gate 22. A motor drive signal from a motor drive signal generator 24 such as a host computer or the like is supplied to the other input terminal of this AND gate 22. An output terminal of the AND gate 22 together with a Q output terminal of the monostable multivibrator 20 is coupled through an OR gate 26 to a motor driver 28 for driving the motor 10. Namely, when the disk detector 18 detects that the floppy disk 6 is not inserted and generates a low level signal, the AND gate 22 functions to inhibit the motor drive signal from the motor drive signal generator 24 from being supplied to the motor driver 28. An initial resetting circuit 30 coupled to an $\overline{R}$ input terminal of the monostable multivibrator 20 resets this monostable multivibrator 20 when a power source is turned on and a power source voltage is supplied to the power source terminal +V1.

In the embodiment shown in FIGS. 2 to 5, in the case where the floppy disk 6 is properly inserted, a collector voltage of the phototransistor 18T becomes high, so that a low level signal is generated from the inverter 21. Therefore, in this case, since the AND gate 22 is enabled, if a low level signal or motor drive signal is generated from the motor drive signal generator 24, the motor driver 28 will drive the motor 10 in response to this motor drive signal.

On the other hand, in the case where the floppy disk 6 is not inserted, the collector voltage of the phototransistor 18T becomes low and a high level voltage is generated from the inverter 21, thereby disabling the AND gate 22. Thus, an output signal of the AND gate 22 becomes "0" irrespective of the output signal from the motor drive signal generator 24; therefore, the motor 10 is not driven irrespective of the motor drive signal from the motor drive signal generator 24.

In addition, in the case of inserting the floppy disk 6, the collector voltage of the phototransistor 18T changes from a low level to a high level, and the output voltage of the inverter 21 varies from a high level to a low level; thus, the monostable multivibrator 20 is driven, and a "1" level signal is generated from the Q output terminal of this monostable multivibrator 20 for a predetermined time. Due to this, the motor 10 is rotated for this predetermined time, thereby allowing the spindle 8 to be rotated and enabling the floppy disk 6 to be appropriately set on this spindle 8.

Figure 6:
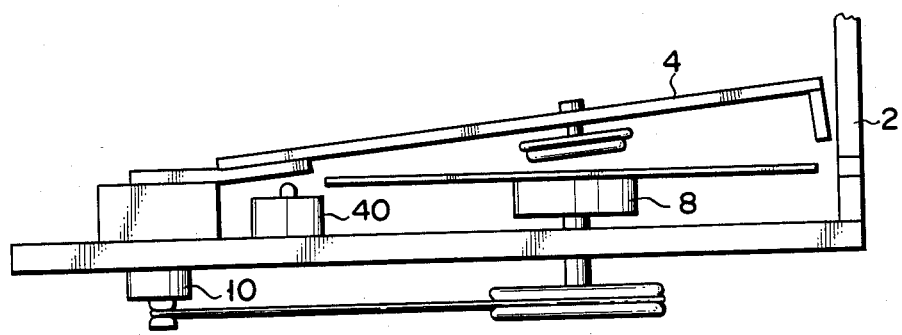
FIG. 6 illustrates a modification of the floppy disk drive apparatus shown in FIGS. 2 and 3.

FIG. 6 is a schematic side elevational view illustrating a floppy disk drive apparatus according to another embodiment of the present invention, in which a microswitch 40 is used in place of the disk detector 18. One end of this microswitch 40 is grounded and the other end is coupled to the power source +V1 through a resistor and to the input terminal of the inverter 21.

In this embodiment, when the floppy disk 6 is inserted and the clamping arm 4 is set into the closed position, the microswitch 40 is turned off, so that a high level voltage is applied to the inverter 21. On the other hand, when this clamping arm 40 is in the open position, the microswitch 40 is held in the ON state, so that a low level voltage is applied to the inverter 21.

In this way, the floppy disk drive apparatus shown in FIG. 6 operates in the manner similar to the embodiment shown in FIGS. 2 to 5 except that the operation of the motor 10 is controlled in dependence upon the closure or opening of the clamping arm 4 instead of whether the floppy disk 6 is inserted or not.

Figure 7:
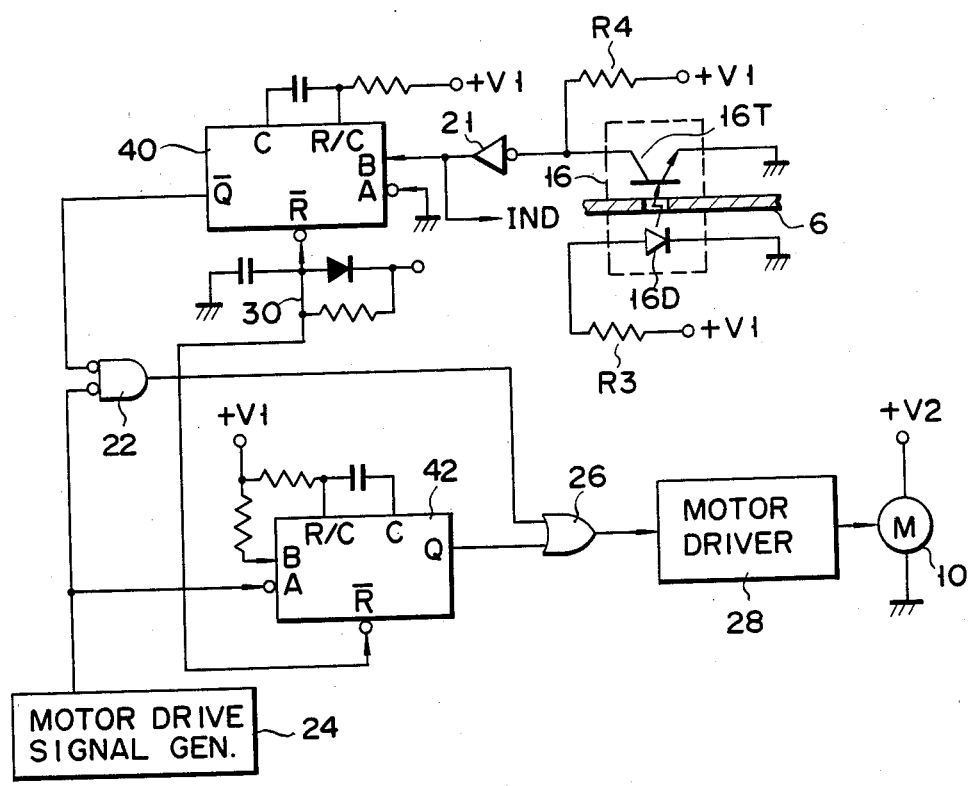
FIG. 7 shows a control circuit of a floppy disk drive apparatus according to another embodiment of the present invention.

FIG. 7 relates to another embodiment of the present invention and shows a motor control circuit of the floppy disk drive apparatus in which the disk detector 18 is omitted and the insertion of the floppy disk 6 is detected by the index hole detector 16. In this control circuit, the index hole detector 16 includes a light-emitting diode 16D which is connected between the power source terminal +V1 through a resistor R3 and the ground, and a phototransistor 16T whose emitter is grounded and whose collector is connected to the power source terminal +V1 through a resistor R4 and to the input terminal of the inverter 21. An output signal from this inverter 21 is supplied as an index signal IND to, for example, the host computer and also to a B input terminal of the monostable multivibrator 40. The monostable multivibrator 40 is triggered in response to the rise of a signal applied to its B input terminal. A high level output signal is generated from its $\overline{Q}$ output terminal after the elapse of a period of time TR which is longer than the time required for one rotation of the floppy disk 6. The $\overline{Q}$ output signal of this monostable multivibrator 40 is coupled to one input terminal of the input inverting type AND gate 22 which receives, at the other terminal, the motor drive signal from the motor drive signal generator 24. The motor drive signal from this motor drive signal generator 24 is also supplied to an A input terminal of a monostable multivibrator 42. This monostable multivibrator 42 is triggered in response to the fall of a signal applied to its A input terminal, and a high level signal is generated from its Q output terminal for a predetermined time. A Q output signal of the monostable multivibrator 42 and an output signal of the AND gate 22 are supplied through the OR gate 26 to the motor driver 28. In addition, the initial resetting circuit 30 is coupled to the monostable multivibrators 40 and 42, and when the power source is turned on, high level and low level output signals are generated from these monostable multivibrators 40 and 42, respectively.

In this embodiment, when the floppy disk 6 is properly inserted, the collector voltage of the phototransistor 16T is held at a high level, and a low level signal is generated from the inverter 21. In this case, a $\overline{Q}$ output signal at a low level is generated from the monostable multivibrator 40, thereby enabling the AND gate 22. Therefore, when a motor drive signal is generated from the motor drive signal generator 24 in this state, this drive signal is supplied to the motor driver 28 through the AND gate 22 and OR gate 26, allowing the motor 10 to be rotated. In the case where the floppy disk 6 is held in the state whereby the phototransistor 16T is turned on by the light emitted from the light-emitting diode 16D through the index hole 6D, a $\overline{Q}$ output signal at a high level is generated from the monostable multivibrator 40, causing the AND gate 22 to be disabled. Even if a drive signal is generated from the motor drive signal generator 24 in this state, this drive signal cannot pass through the AND gate 22. However, in this case, the monostable multivibrator 42 generates a high level signal in response to the fall of this drive signal for a predetermined interval, thereby rotating the motor 10 by only a predetermined angle. Thereafter, the phototransistor 16T is turned off, and the AND gate 22 is enabled in response to the $\overline{Q}$ output signal from the monostable multivibrator 40 so that the drive signal is supplied through the AND gate 22 and OR gate 26 to the motor driver 28.

On the other hand, in the case where the floppy disk 6 is not inserted, the phototransistor 16T is held at the on state and the AND gate 22 is disabled in response to the $\overline{Q}$ output signal from the monostable multivibrator 40. Thus, in this case, even if the drive signal is continuously generated from the motor drive signal generator 24, the motor 10 will be rotated by only a predetermined angle in response to the fall of this drive signal and thereafter it is stopped.

FIG. 8 shows a modification of the motor control circuit shown in FIG. 7. This motor control circuit is constituted and operates substantially in the same manner as that shown in FIG. 7 except that it is provided with an input-inverting type NOR gate 44 whose input terminals are respectively connected to the $\overline{Q}$ output terminal of the monostable multivibrator 40 and to the output terminal of the inverter 21, and whose output terminal is connected to one input terminal of the input inverting type AND gate 22.

In this embodiment, when the drive signal is generated from the motor drive signal generator 24 in the state in that the floppy disk 6 is not inserted, the motor 10 is rotated by a predetermined angle and thereafter it is stopped. In this state, when the floppy disk 6 is inserted, a low level signal is generated from the inverter 21. This allows a "0" level signal to be generated from the NOR gate 44. Therefore, the AND gate 22 is enabled, and the motor drive signal is supplied through the AND gate 22 and OR gate 26 to the motor driver 28, causing the motor 10 to be rotated. In this way, in this embodiment, when the floppy disk 6 is inserted while the motor drive signal is being generated from the motor drive signal generator 24, this floppy disk 6 can be rotated immediately after the floppy disk 6 is inserted.

Figure 9:
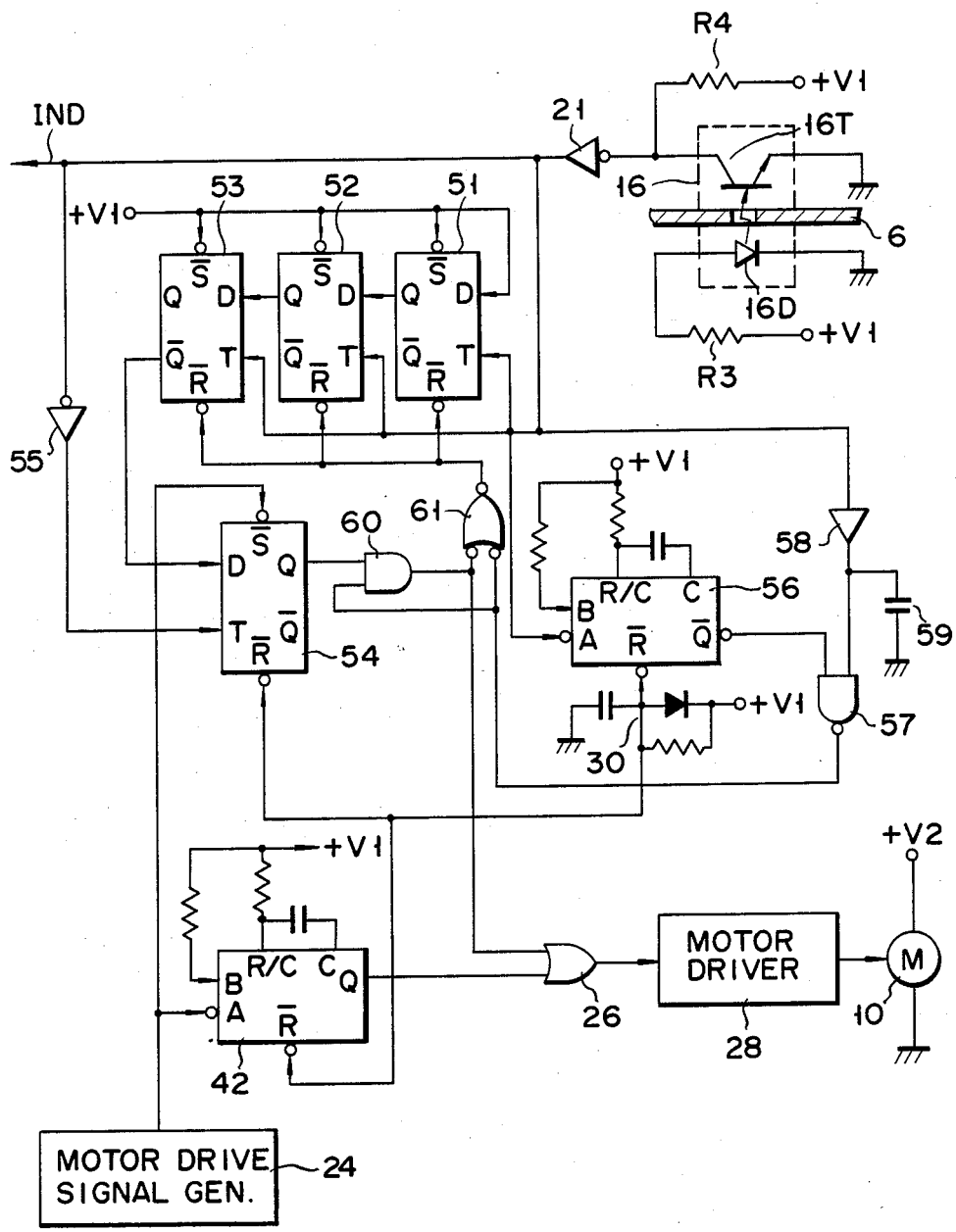
FIG. 9 shows a control circuit of a floppy disk drive apparatus according to another embodiment of the present invention.

FIG. 9 shows a motor control circuit of a floppy disk drive apparatus according to another embodiment of the present invention. This motor control circuit is constituted in the manner similar to that shown in FIG. 7 except that it is provided with a control section which will be described hereinbelow in place of the monostable multivibrator 40 and AND gate 22. This control section includes three flip-flops 51 to 53 in cascade connection whose T input terminals are coupled to the output terminal of the inverter 21; a flip-flop 54 whose D input terminal is connected to a $\overline{Q}$ output terminal of the flip-flop 53 and whose T input terminal is connected through an inverter 55 to the output terminal of the inverter 21; and a monostable multivibrator 56 whose A input terminal is connected to the output terminal of the inverter 21. A $\overline{Q}$ output terminal of this monostable multivibrator 56 is coupled to one input terminal of a NAND gate 57 which is coupled at the other input terminal through a buffer 58 to the inverter 21 and is also grounded through a capacitor 59. An output terminal of the NAND gate 57 is connected to one input terminal of an AND gate 60 which is coupled at the other input terminal to a Q output terminal of the flip-flop 54. At the same time it is connected to an input-inverting type NOR gate 61 whose one input terminal is coupled to an output terminal of this AND gate 60.

The flip-flop 54 and monostable multivibrator 56 are set in response to an output signal of the initial resetting circuit 30, while the flip-flops 51 to 53 are reset in response to a low level signal from the NOR gate 61. In addition, the flip-flops 51 to 53 are set when the power source is turned on, while the flip-flop 54 is set when the motor drive signal is supplied.

In this embodiment, in the case where the floppy disk 6 is not inserted, since the output signal of the inverter 21 is held at a high level, the monostable multivibrator 56 is not triggered and a high level signal is generated from its $\overline{Q}$ output terminal. Consequently, both input signals to the NAND gate 57 become high, causing a low level signal to be generated from this NAND gate 57. Due to this, a "0" level signal is generated from the AND gate 60 irrespective of the Q output signal of the flip-flop 54. Therefore, in this case, even if the motor drive signal is generated from the motor drive signal generator 24, the motor driver 28 will rotate the motor 10 by a predetermined angle in response to a high level signal which is generated from the monostable multivibrator 42 for a predetermined interval; however, thereafter this motor 10 will be held stopped again.

On one hand, in the case where the floppy disk 6 is inserted, a low level signal is generated from the inverter 21, and a "1" level signal is generated from the NAND gate 57. At the same time, since an output signal from the inverter 55 changes from a low level to a high level, the flip-flop 54 is set responsive to a high level $\overline{Q}$ output signal from the flip-flop 53. Thus, a high level Q output signal of this flip-flop 54 is supplied through the AND gate 60 and OR gate 26 to the motor driver 28, thereby rotating the motor 10. This causes the floppy disk 6 to be rotated. The level of the output signal of the inverter 21 changes whenever the index hole 6D of the floppy disk 6 is detected by the index hole detector 16, thereby allowing the flip-flops 51 to 53 to be sequentially set. When the flip-flop 53 at the final stage is set, a $\overline{Q}$ output signal of this flip-flop 53 becomes low. Thus, the flip-flop 54 is set into a "0" state in response to the rise of the output signal from the inverter 55, and a "0" level signal is generated from the AND gate 60 so that the rotation of the motor 10 is stopped.

In addition, when the motor drive signal is generated while the floppy disk 6 is inserted, the flip-flop 54 is held into the set state; therefore, the rotation of the motor 10 is not interrupted.

Figure 10:
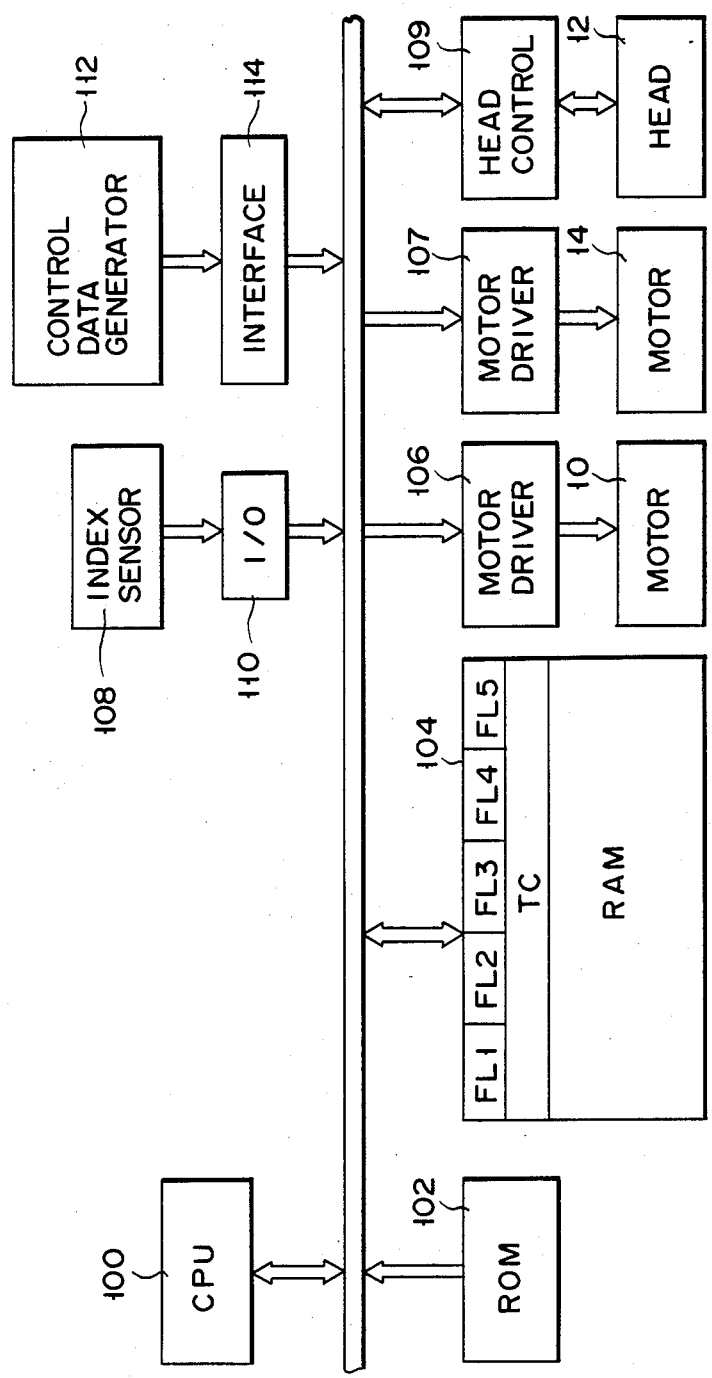
FIG. 10 shows a block diagram of a floppy disk drive apparatus according to another embodiment of the present invention.

FIG. 10 is a block diagram of the principal part of a floppy disk drive apparatus according to a further embodiment of the invention. This floppy disk drive apparatus includes a central processing unit (CPU) 100, a read only memory (ROM) 102 and a random access memory (RAM) 104 connected to the CPU 100 by means of data buses, motor drivers 106 and 107 for driving the motors 10 and 14, respectively, an index sensor 108 connected to an I/O port 110, a head control 109 for executing data read/write processing for the head 12, and a control data generator 112 connected to the CPU 100 through an interface 114. The RAM 104 has flag memory areas FL1 to FL4. The index sensor 108 is formed of the light-emitting diode 16D and the phototransistor 16T. The control data generator 112 generates control data including a read/write signal, write inhibit signal, drive select signal, step signal, motor control signal, etc. in response to an output signal from, e.g., an external keyboard circuit (not shown).

After the power source is turned on, the CPU 100 executes a main routine shown in FIG. 11. Namely, the CPU 100 repeatedly executes subroutines for an index check, motor drive signal check, step signal check, and write-in signal check after executing initialization processing including the clearing of the contents of the RAM 104.

Figure 12B:
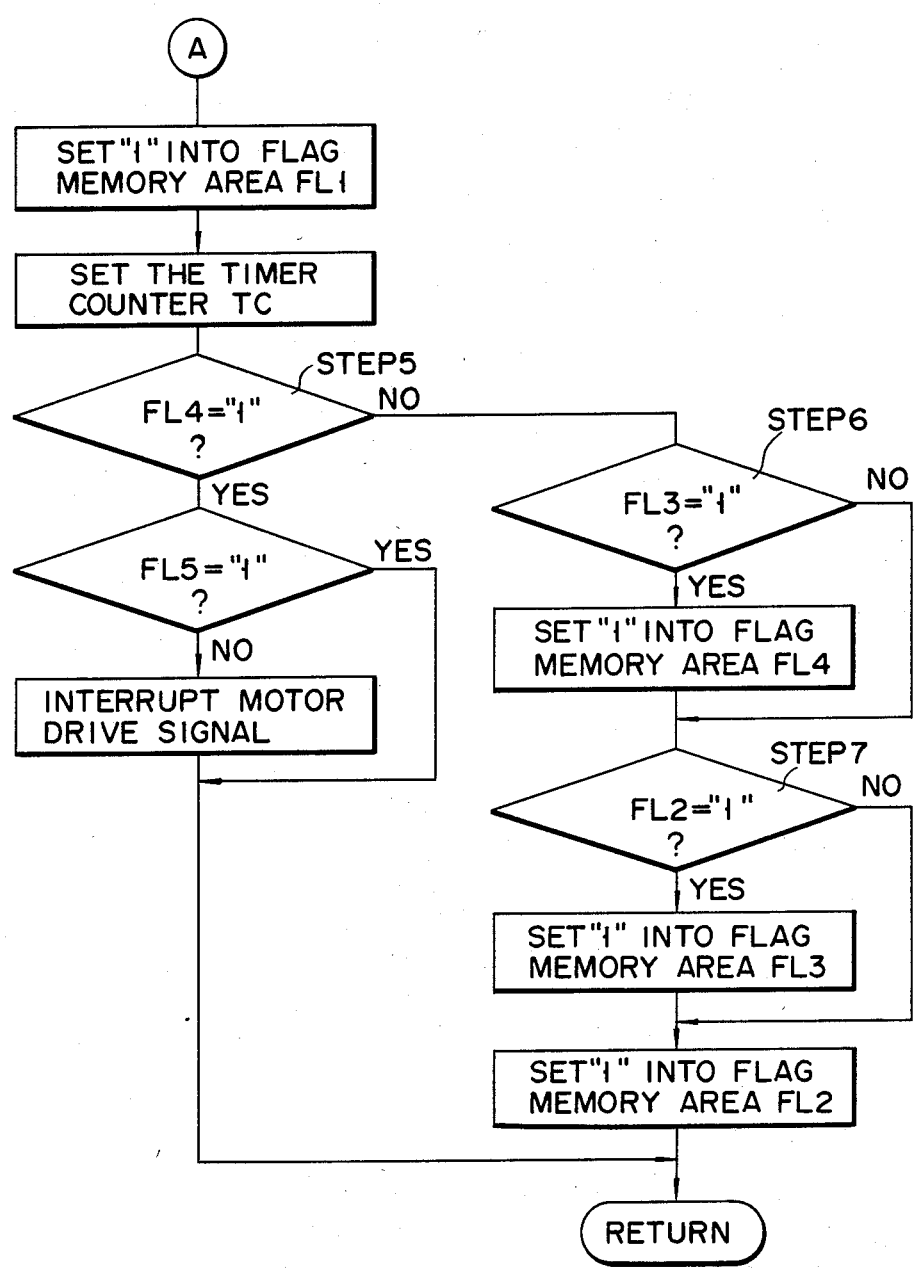

FIGS. 12A and 12B are flow charts showing an index check subroutine for executing a similar motor control attained by the circuit shown in FIG. 10. In this subroutine, the CPU 100 checks to see if the level of the index output signal from the index sensor 108 is high, that is, if the phototransistor 16T is set nonconductive in STEP 1. If generation of a lowlevel index output signal from the index sensor 108 is detected, that is, if the phototransistor 16T is found to be conductive, then the CPU 100 checks to see if the flag memory area FL1 has the content of "1", that is, if the index output signal in the preceding cycle was at a low level in STEP 2. If storage of data "1" in the flag memory area FL1 is detected in STEP 2, the CPU 100 checks to see if the time TL in which the index output signal is kept at a low level is longer than the time TR which is set slightly longer than the time required for one rotation of the floppy disk 6. If TL ≦ TR, the index check subroutine is ended.

If TL>TR, the CPU 100 writes data "0" into each of the flag memory areas FL2 to FL4, interrupts the motor drive signal, and then ends the index check subroutine.

In addition, in STEP 1, when the index output signal is detected to be at a high level, the CPU 100 checks to see whether or not data "1" has been stored in the flag memory area FL1 in STEP 3. When it is detected that data "1" has been stored in the flag memory area FL1, i.e., when it is detected that the index output signal has changed from high to low, then the CPU 100 checks to see whether or not data "1" has been stored in the flag memory area FL2 in STEP 4. In the case where the storage of data "1" in the flag memory area FL2 is detected, the motor 10 is driven to allow the floppy disk 6 to be rotated, and thereafter, data "0" is stored into the flag memory area FL1. On the other hand, in the case where the storage of data "0" in the flag memory area FL2 is detected, data "0" is stored into the flag memory area FL1 without driving the motor 10, thus ending the index check subroutine.

Next, in STEP 2, when the storage of data "0" in the flag memory area FL1 is detected, that is, in the case where it is detected that the index output signal has changed from low to high, data "1" is written into the flag memory area FL1, and a predetermined time data corresponding to the time TR required for one rotation of the floppy disk 6 is further set in a timer counter TC. Then in STEP 5, when the contents of the flag memory area FL4 is checked and when the storage of data "0" in this flag memory area FL4 is detected, the contents of the flag memory area FL3 is checked in STEP 6. In the case where the storage of data "0" in this flag memory area FL3 is detected, the contents of the flag memory area FL2 is checked in STEP 7. When the contents of this flag memory area FL2 is "0", data "1" is set into the flag memory area FL2, and thereafter, this index check subroutine is finished. In addition, when the storage of data "1" in the memory areas FL3 and FL2 is detected respectively in STEP 6 and STEP 7, data "1" is stored into the flag memory areas FL4 and FL3. On one hand, in the case where the storage of data "1" in the flag memory area FL4 is detected in STEP 5, the contents of the flag memory area FL5 is checked. When the contents of this flag memory area FL5 is "0", this index check subroutine is ended after the motor drive signal is interrupted, or it is immediately ended when the contents of this memory area FL5 is "1".

FIG. 13 shows a subroutine for executing a motor drive signal check. Firstly, the CPU 100 checks to see if the motor drive signal is generated from the control data generator 112 or not. When it is detected that this motor drive signal is not generated, the motor drive signal check subroutine is ended after data "1" has been stored into the flag memory area FL5. On the other hand, when the generation of the motor drive signal is detected, the contents of the flag memory area FL5 is checked. When it is detected that the contents of this flag memory area FL5 is "1", the motor drive signal check subroutine is ended. When it is detected that the contents of the memory area FL5 is "0", the motor 10 is driven. After data "1" is stored into the flag memory area FL5, the motor drive signal check subroutine is ended.

In this embodiment, in the case where the insertion of the floppy disk 6 is detected, the output signal of the index sensor 108 changes from low to high. In this case, after the processings in STEPs 1, 3 and 4 were executed, the CPU 100 generates a motor drive signal to drive the motor 10. Due to this, the spindle 8 is rotated and the floppy disk 6 is desirably set on this spindle 8. Data "1" is sequentially stored into the flag memory areas FL2 to FL4 whenever the index hole 6D of this floppy disk 6 is detected by the index sensor 108. In this way, this index hole 6D is detected three times. Unless a motor drive signal MDS is generated from the control data generator 112 when the index hole 6D is detected after data "1" has been stored into the flag memory area FL4, the CPU 100 will stop the driving of the motor 10. In addition, in this case, if the motor drive signal MDS is generated, the CPU 100 will continuously drive the motor 10.

Moreover, when the motor drive signal MDS is generated from the control data generator 112 in the case where the floppy disk 6 is not inserted, the motor 10 is driven in accordance with the motor drive signal check subroutine. However, the driving of this motor 10 is immediately stopped in accordance with the next index check subroutine. Thereafter the motor 10 is not driven since data "1" has been stored into the flag memory area FL5. Furthermore, in the case where an answer of "NO" is not obtained again in STEP 2 before the time TR elapses after a predetermined time data was set into the timer counter TC, the CPU 100 will stop the motor 10.

Although the present invention has been described above with respect to the embodiments, the invention is not limited to only these embodiments. For example, in the embodiment shown in FIG. 5, the monostable multivibrator 20, OR gate 26 and initial resetting circuit 30 may be omitted. In this case, even if the motor drive signal MDS is generated when the floppy disk 6 is not inserted, it is possible to inhibit the driving of the motor 10.

What is claimed is:
1. A floppy disk drive apparatus comprising:
a disk holding member for holding a floppy disk;
drive signal generating means for generating a drive signal irrespective of the insertion state of the floppy disk to rotate said disk holding member when effecting read/write operation with respect to said floppy disk;
disk drive means driven in response to the drive signal from said drive signal generating means for thereby rotatiang said disk holding member;
first control means for inhibiting said drive signal which is generated by said drive signals generating means from being supplied to said disk drive means when it is detected that the floppy disk is not held on said disk holding member.

2. A floppy disk drive apparatus according to claim 1, wherein said floppy disk has an index hole and said first control means comprises: a first detecting circuit for generating an index signal when it detects the index hole; a second detecting circuit for generating a detection signal when it detects that the floppy disk is held on said holding member; and an inhibiting circuit means for inhibiting the drive signal supplied to said disk drive means when the detection signal is not generated from said second detecting circuit.

3. A floppy disk drive apparatus according to claim 2, further comprising second control means for supplying an output signal to said disk drive means for a predetermined interval in response to the leading edge of the detection signal from said second detecting circuit, thereby rotating said holding member.

4. A floppy disk drive apparatus according to claim 3, wherein said second detecting circuit includes a photocoupler.

5. A floppy disk drive apparatus according to claim 3, wherein said second detecting circuit includes a microswitch.

6. A floppy disk drive apparatus according to claim 1, wherein said first control means comprises a second detecting circuit for generating a detection signal when it detects that the floppy disk is held on said holding member; and further comprising second control means for supplying an output signal to said disk drive means for a predetermined interval in response to the leading edge of the detection signal from said second detecting circuit, thereby rotating said holding member.

7. A floppy disk drive apparatus according to claim 1, wherein said floppy disk has an index hole and said first control means comprises: a detecting circuit means for detecting the index hole of the floppy disk and for generating an index signal in response thereto, and for generating a detection signal when it detects that said floppy disk is held on said holding member; an inhibiting signal generating circuit means for generating an inhibiting signal after the elapse of a predetermined time from generation of the index signal or detection signal by said detecting circuit; and an inhibiting circuit means for inhibiting supply of the drive signal from said drive signal generating means to said disk drive means in response to the inhibiting signal from said inhibiting signal generating circuit means.

8. A floppy disk drive apparatus according to claim 7, further comprising second control means for supplying an auxiliary drive signal to said disk drive means for a predetermined time interval in response to the drive signal from said drive signal generating means.

9. A floppy disk drive apparatus according to claim 8, wherein said inhibiting signal generating circuit means and said second control means comprise a monostable multivibrator, respectively.

10. A floppy disk drive apparatus according to claim 9, further comprising an initial resetting circuit for resetting said respective monostable multivibrators when a power source is turned on.

11. A floppy disk drive apparatus according to claim 10, wherein said detecting circuit comprises a photocoupler.

12. A floppy disk drive apparatus according to claim 8, further comprising a logic circuit means for blocking supply of the inhibiting signal from said inhibiting signal generating circuit means to said inhibiting circuit means when the detection signal is generated from said detecting circuit means.

13. A floppy disk drive apparatus according to claim 7, further comprising a logic circuit means for blocking supply of the inhibiting signal from said inhibiting signal generating circuit means to said inhibiting circuit means when the detection signal is generated from said detecting circuit means.

14. A floppy disk drive apparatus according to claim 7, wherein said inhibiting signal generating circuit means and said second control means comprise a monostable multivibrator, respectively.

15. A floppy disk drive apparatus according to claim 14, further comprising an initial resetting circuit for resetting said respective monostable multivibrators when a power source is turned on.

16. A floppy disk drive apparatus according to claim 1, wherein said floppy disk has an index hole and said first control means comprises: a detecting circuit means for detecting the index hole of the floppy disk, and for generating an index signal in response thereto, and for generating a detection signal when it detects that said floppy disk is held on said holding member; an inhibiting signal generating circuit means for generating an inhibiting signal when the detection signal is not generated from said detecting circuit means; a control circuit means which generates a first drive control signal for allowing said holding member to be rotated by a predetermined number of times in response to the detection signal from said detecting circuit and for generating a second drive control signal to said disk drive means in response to the drive signal from said drive signal generating means; and inhibiting means for inhibiting the first and second drive control signals of said control circuit means from being supplied to said disk drive means in response to the inhibiting signal from said inhibiting signal generating circuit means.

17. A floppy disk drive apparatus according to claim 16, wherein said control circuit means comprises: a counter circuit means for counting said index signal in response to the detection signal from said detecting circuit means and for generating a count output signal until the count content reaches a predetermined value; and a flip-flop circuit means which is set into a first state in response to the count output signal of said counter circuit means and to the drive signal from said drive signal generating means for generating said first and second drive control signals, respectively, and which is set into a second state in response to the index signal to be generated from said detecting circuit means after the termination of said count output signal and drive signal.

18. A floppy disk drive apparatus according to claim 17, further comprising second control means for supplying an auxiliary drive signal to said disk drive means for a predetermined interval in response to the drive signal from said drive signal generating means.

19. A floppy disk drive apparatus according to claim 1, wherein said floppy disk has an index hole and said first control means comprises: a detecting circuit means for detecting the index hole of the floppy disk and for generating an index signal in response thereto, and for generating a detection signal when it detects that said floppy disk is held on said holding member; and an inhibiting circuit means for inhibiting the drive signal from said drive signal generating means from being supplied to said disk drive means when said detection signal is not generated from said detecting circuit means.

20. A floppy disk drive apparatus according to claim 19, further comprising second control means for supplying an auxiliary drive signal to said disk drive means for a predetermined interval in response to the drive signal from said drive signal generating means.

21. A floppy disk drive apparatus comprising:
a disk holding member for holding a floppy disk;
drive signal generating means for generating a drive control signal to rotate said disk holding member when effecting read/write operation with respect to said floppy disk;
disk drive means driven in response to a drive signal for thereby rotating said disk holding member;
head means for effecting read/write operation with respect to said floppy disk; and
first control means for supplying a drive signal in response to the drive control signal from said drive signal generating means to said disk drive means and for inhibiting the drive control signal supplied to said disk drive means when it is detected that the floppy disk is not held on said disk holding member.

22. A floppy disk drive apparatus according to claim 21, wherein said floppy disk has an index hole and in which said first control means detects the index hole of the floppy disk to generate an index signal in response thereto at a first predetermined level, said first control means includes: a detecting circuit means for generating a detection signal at a second predetermined level when it detects that said floppy disk is held on said holding member; a data processing circuit means for applying a stop signal to said disk drive means in response to an output signal at a first predetermined level from said detecting circuit means; and memory means coupled to said detecting circuit.

23. A floppy disk drive apparatus according to claim 22, wherein said memory means has a first memory area for storing data related to the time when the output signal from said detecting circuit means is continuously kept at said first predetermined level, and wherein said data processing circuit means applies the stop signal to said disk drive means when it is detected that the contents of said first memory area exceeds a predetermined value.

24. A floppy disk drive apparatus according to claim 23, wherein said data processing circuit means applies an energization signal to said disk drive means when it is detected that the output signal from said detecting circuit means changes from said first predetermined level to said second predetermined level, and said memory means has a second memory area for storing data relating to the rotating speed of the floppy disk to be rotated when the drive signal is not generated from said drive signal generating means, and wherein said data processing circuit means applies the stop signal to said disk drive means when it is detected that the content of said second memory area reaches a predetermined value.

* * * * *